(12) United States Patent
Cummings

(10) Patent No.: US 6,914,417 B2
(45) Date of Patent: Jul. 5, 2005

(54) ELECTRICAL ENERGY SYSTEMS, POWER SUPPLY APPARATUSES, AND ELECTRICAL ENERGY SUPPLY METHODS

(75) Inventor: John Cummings, Round Rock, TX (US)

(73) Assignee: Valence Technology, Inc., Henderson, NV (US)

( * ) Notice: Subject to any disclaimer, the term of this patent is extended or adjusted under 35 U.S.C. 154(b) by 20 days.

(21) Appl. No.: 10/426,486

(22) Filed: Apr. 29, 2003

(65) Prior Publication Data

US 2004/0217739 A1 Nov. 4, 2004

(51) Int. Cl.7 .............................................. H01M 10/46
(52) U.S. Cl. ...................................................... 320/137
(58) Field of Search ................................ 320/103, 125, 320/137, 138; 363/74, 78, 80

(56) References Cited

U.S. PATENT DOCUMENTS

| | | | | |
|---|---|---|---|---|
| 4,315,162 A | * | 2/1982 | Ferguson | ...................... 307/66 |
| 5,297,015 A | * | 3/1994 | Miyazaki et al. | ........... 363/146 |

FOREIGN PATENT DOCUMENTS

WO    WO 01/54212 A1    7/2001    ............ H01M/4/48

OTHER PUBLICATIONS

"Power Pad, Electrovaya's Extended Life Laptop Computer Battery"; http:/www.fivestaradvantage.com/electrofuel/: May 13, 2002; 2 pp.

"TargueUniversal Auto Air Notebook Power Adapter for Apple, Dell, Gateway, HP, and Sony"; http://www.port.com/default.product.asp?sku=PA380U: May 23, 2002; 3 pp.

"Power Supply Apparatuses and Methods of Supplying Electrical Energy", U.S. Appl. No. 10/072,827.

* cited by examiner

*Primary Examiner*—Edward H. Tso
(74) *Attorney, Agent, or Firm*—Michael D. Ross; Roger A. Williams; Cynthia S. Kovacevic

(57) ABSTRACT

An electrical energy system comprising a power supply apparatus having an electrical energy storage device for storing electrical energy, an external load having one or more batteries, the load adapted to receive electrical energy from the electrical energy storage device, and wherein the power supply apparatus comprises control circuitry for monitoring a condition of the power supply apparatus and controlling an operation of the load responsive to the monitored condition.

40 Claims, 5 Drawing Sheets

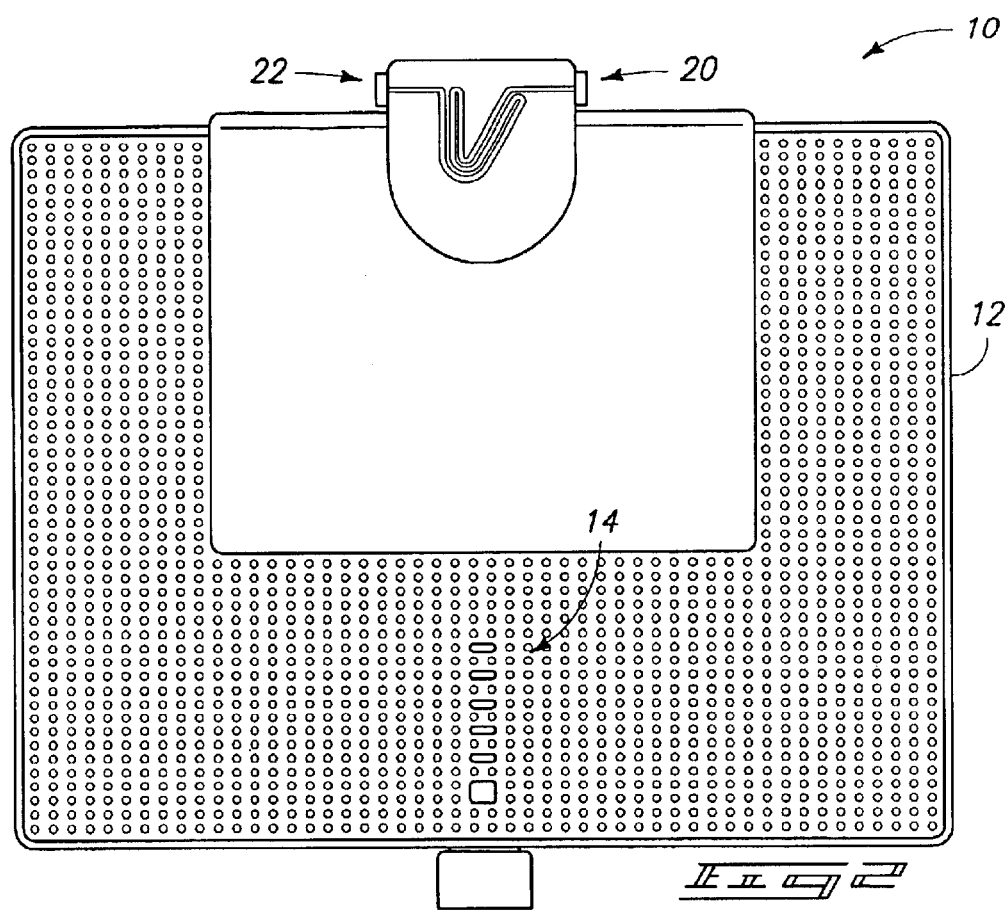
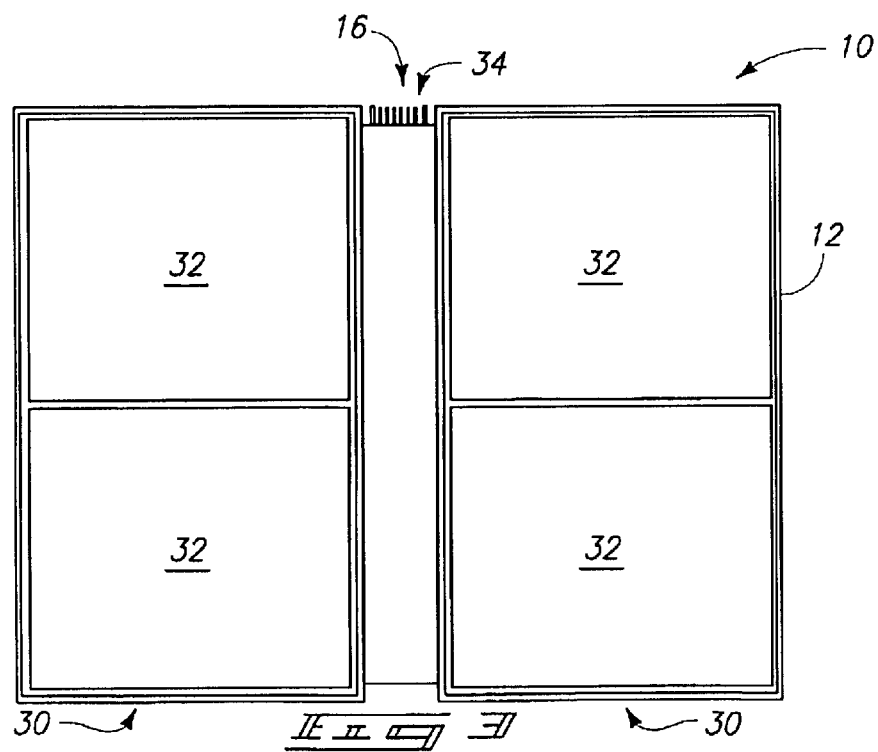

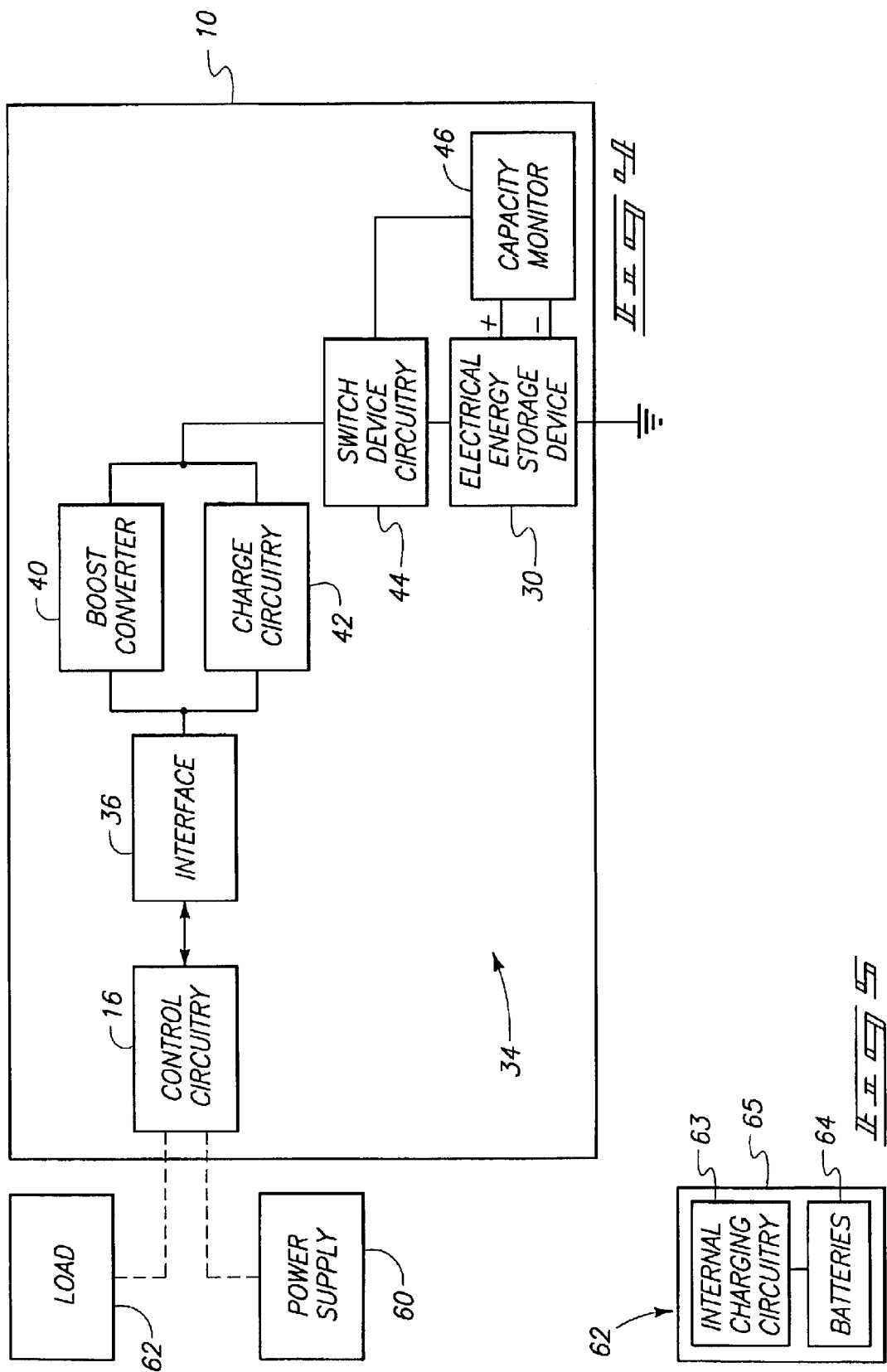

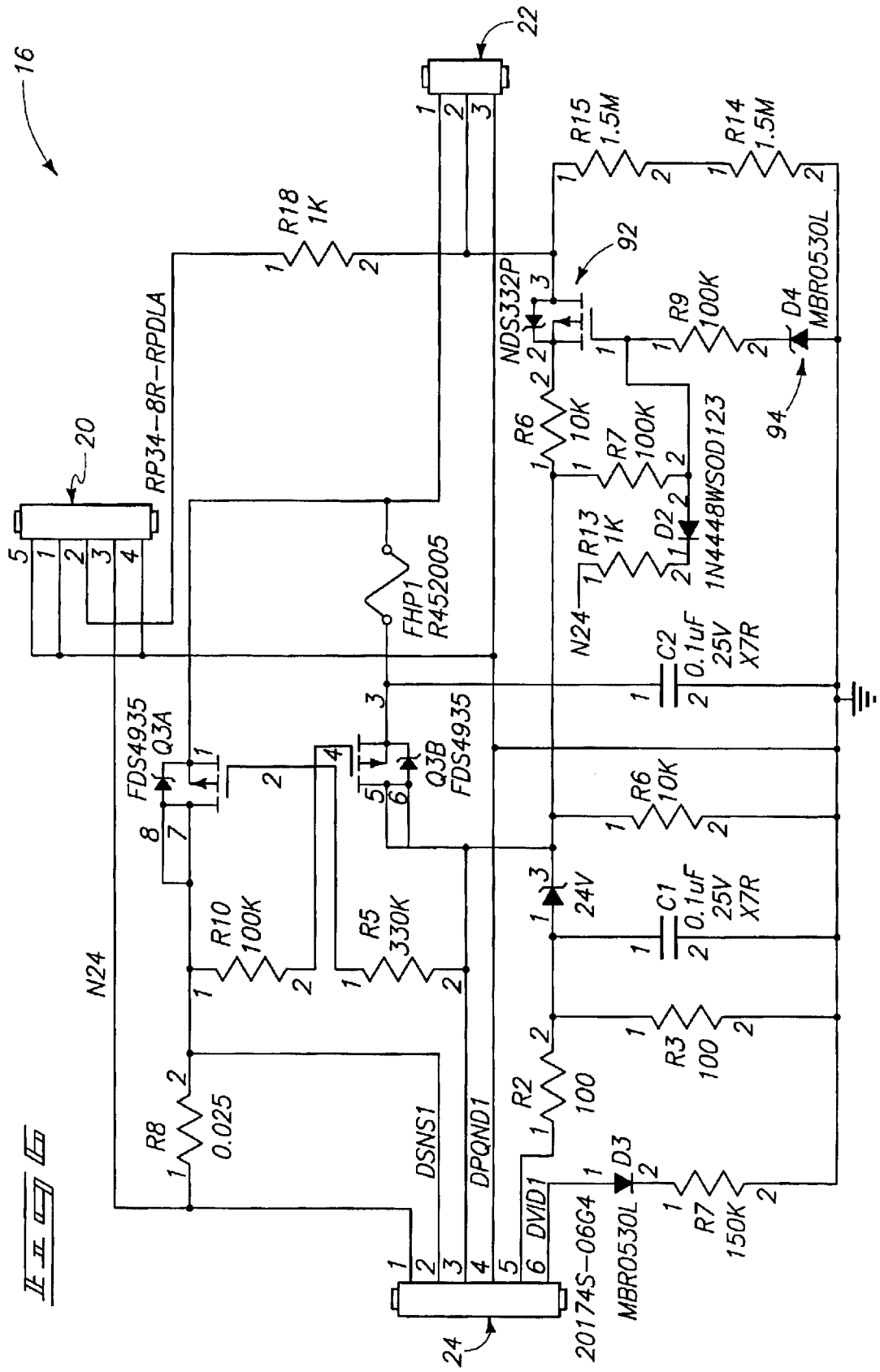

ELECTRICAL ENERGY SYSTEMS, POWER SUPPLY APPARATUSES, AND ELECTRICAL ENERGY SUPPLY METHODS

FIELD OF THE INVENTION

This invention generally relates to electrical energy systems, power supply apparatuses, and electrical energy supply methods.

BACKGROUND OF THE INVENTION

Numerous people rely upon or have grown accustomed to usage of electrical consumer devices for business, education, or for other needs. Electronic consumer devices are increasingly portable to accommodate these needs during travel from home or the workplace. The sophistication and capabilities of power supplies for such devices have also improved to meet the requirements of the electronic consumer devices. For example, cost, size, and capacity are some product characteristics which have been improved for the portable power supplies for electronic applications. There is a desire to enhance these and other design parameters of power supplies, including portable power supplies, to accommodate increasing power requirements of modern electronic consumer devices.

Rechargeable batteries are charged by battery chargers such as trickle chargers and fast chargers. Fast chargers are preferred over trickle chargers due to their fast charging time. Portable devices attempt to use the maximum available power from a wall adapter when recharging the internal batteries. However, a battery can be overcharged by a fast charger because of the high current used for charging. In order to prevent a continuous overcharge, a fast charger requires circuitry to discontinue charging of the battery. Without such circuitry, the fast charger will overcharge the battery, risking damage to the battery. Overcharging also shortens battery life by heating the battery which deteriorates a separator in the cells. Portable devices attempt to use maximum available power from a wall adapter when recharging internal batteries of the portable device. Currently, some manufacturers adopt 90 W adapters to both power the portable device as well as charge the portable device's batteries as quickly as possible.

At least some aspects provide improved electrical energy systems, power supply apparatuses, and methods of supplying power.

SUMMARY OF THE INVENTION

At least some embodiments of the invention relate to electrical energy systems, power supply apparatuses, and electrical energy supply methods.

According to one embodiment, an electrical energy system comprises a power supply apparatus having an electrical energy storage device for storing electrical energy, an external load having one or more batteries, the load adapted to receive electrical energy from the electrical energy storage device, and wherein the power supply apparatus comprises control circuitry for monitoring a condition of the power supply apparatus and controlling an operation of the load responsive to the monitored condition.

According to another embodiment, a power supply apparatus comprises an interface adapted to couple to an external load, an electrical energy storage device coupled with the interface and configured to supply electrical energy to the external load via the interface, and control circuitry configured to monitor an internal condition of the power supply apparatus and to control an operation of the external load responsive to the monitored condition.

According to a further embodiment, an electrical energy system comprises a power supply apparatus, an external load removably coupled to the power supply apparatus, the power supply apparatus including an electrical energy storage device, and a boost converter configured to increase a voltage of electrical energy received from the storage device, and to provide the electrical energy of increased voltage to the external load, and control circuitry for controlling internal charging circuitry of the load responsive to monitoring a temperature of the boost converter.

According to yet another embodiment, an electrical energy supply method comprises providing a power supply apparatus and a load disposed external to the power supply apparatus, supplying electrical energy from the power supply apparatus the load, monitoring an internal condition of the power supply apparatus using circuitry of the power supply apparatus, and controlling an operation of the load responsive to the monitored condition.

According to an additional embodiment, an electrical energy supply method comprises providing a power supply apparatus configured to store electrical energy, removably coupling an external load to the power supply apparatus, the load operating at a first rate of consumption, supplying electrical energy from the power supply apparatus to the external load, monitoring an internal condition of the power supply apparatus, and using the power supply apparatus, controlling the external load to operate in a reduced second rate of electrical energy consumption responsive to the monitoring.

According to another embodiment, a load charge control method comprises providing a power supply apparatus having control circuitry, the power supply apparatus configured to supply electrical energy to the load, providing the load external of the power supply apparatus, the load having internal charging circuitry to control charging thereof, coupling the power supply apparatus to the load, monitoring an internal condition of the power supply apparatus, and controlling charging of the load using the power supply apparatus responsive to the monitoring.

Other aspects of the invention are disclosed herein as is apparent from the following description and figures.

DESCRIPTION OF THE DRAWINGS

Preferred embodiments of the invention are described below with reference to the following accompanying drawings.

FIG. 2 is an illustrative representation of the power supply apparatus shown in FIG. 1 according to various embodiments.

FIG. 3 is an illustrative representation of exemplary internal components of the power supply apparatus illustrated in FIG. 1.

FIG. 4 is a detailed functional block diagram illustrating components of the power supply apparatus shown in FIG. 1.

FIG. 5 shows exemplary details of components of a load shown in FIG. 1.

FIG. 6 is an exemplary circuit schematic of the control circuitry shown in FIG. 1.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 1:
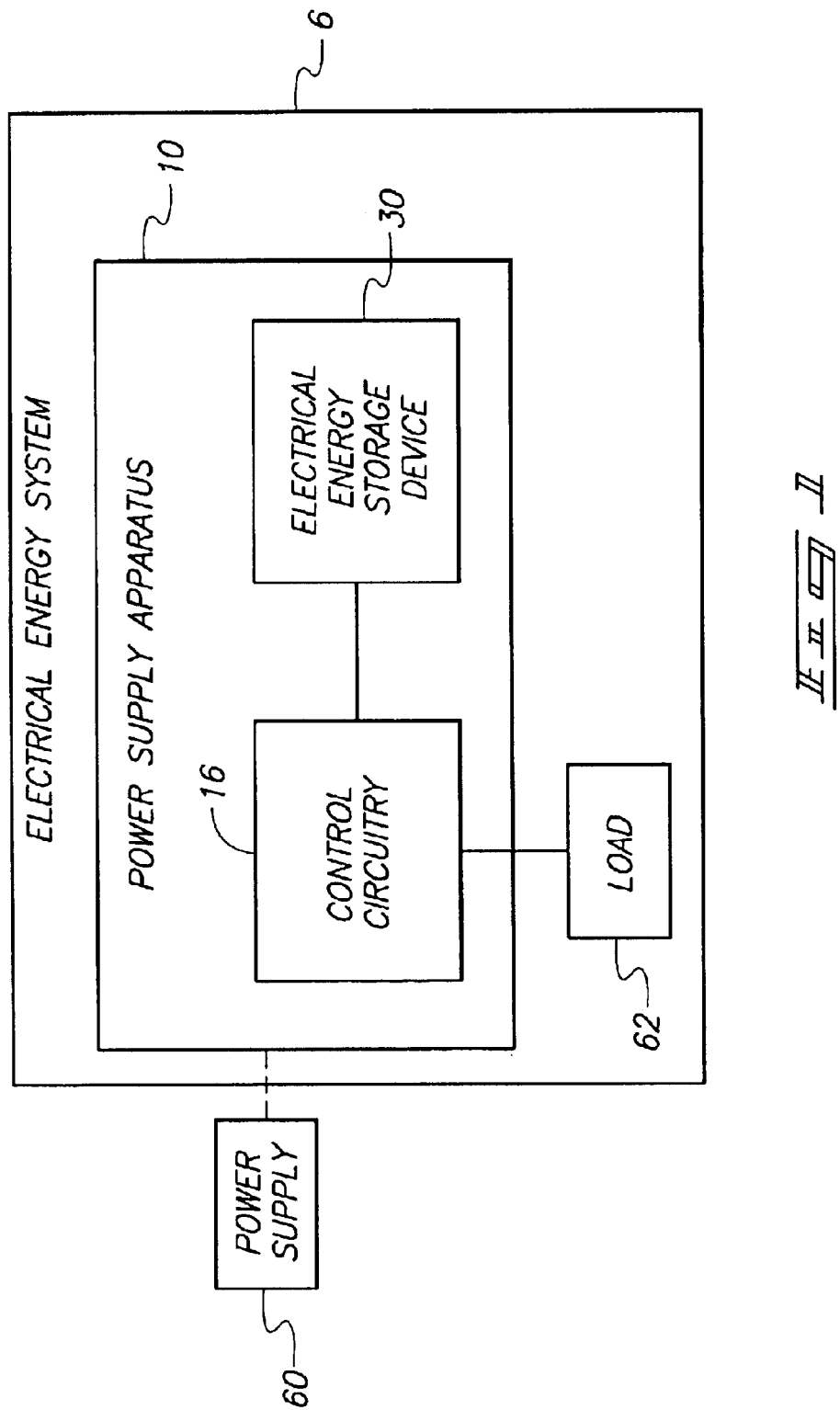
FIG. 1 is a high-level functional block diagram of an exemplary electrical energy system according to one embodiment.

Referring to FIG. 1, an exemplary arrangement of an electrical energy system 6 according to aspects of the present invention is shown. The electrical energy system 6 includes a power supply apparatus 10 configured to receive electrical energy from power supply 60, and a load 62 configured to receive electrical energy from the power supply apparatus 10. In an exemplary configuration, the power supply apparatus 10 includes control circuitry 16, and an electrical energy storage device 30 having one or more electrochemical storage devices 32 (FIG. 3) for storing electrical energy, further details of the storage device 30 are illustrated in FIG. 3. The load 62 may be detachably connected to the power supply apparatus 10. In one embodiment, load 62 may be a high or low power load, such as for example, a laptop computer, a personal digital assistant (PDA), a cellular phone, or the like.

In another embodiment, the control circuitry 16 may be located outside of the power supply apparatus with an appropriate interface to couple to the power supply apparatus 10.

Referring to FIG. 2, an exemplary arrangement of a power supply apparatus 10 according to aspects of the present invention is shown. The power supply apparatus 10 is arranged to provide electrical energy to the load 62 (FIG. 1). In at least one aspect of the present invention, power supply apparatus 10 is arranged to provide high-power electrical energy to a load consuming high power and having power ratings, for example, in excess of 20 watts (and having exemplary operational voltages of 16–20 Volts or more). Additional details regarding the exemplary power supply apparatus 10 are described in a co-pending U.S. patent application having Ser. No. 10/072,827, filed on Feb. 8, 2002 and entitled "Power Supply Apparatuses and Methods of Supplying Electrical Energy," the entire contents of which are incorporated herein by reference.

In exemplary applications, power supply apparatus 10 is arranged as a portable device configured to provide portable electrical energy to portable loads or devices. Power supply apparatus 10 may be utilized to provide electrical power to other devices or may be configured in other arrangements to power devices of other wattage ratings. The particular arrangement of power supply apparatus 10 may be modified and tailored to accommodate the energy requirements of the utilized load(s).

The power supply apparatus 10 includes a housing 12 configured to house components (e.g., control circuitry 16, electrical energy storage device 30, interface 36, boost converter 40, etc.) as shown in FIG. 4. The exemplary arrangement of the power supply apparatus 10 shown in FIG. 2 includes at least one indicator 14 configured to provide charge status information of the storage device 30 and/or power supply apparatus 10. In the depicted exemplary embodiment, indicator 14 is implemented as a plurality of light emitting diodes (LEDs).

The power supply apparatus 10 includes appropriate receptacle(s) or connection jack(s) to accommodate cables or other connections utilized for coupling with the load 62 and/or power supply 60. In the depicted exemplary arrangement, power supply apparatus includes a connection jack 20 configured to receive a cable or other connection to couple with the power supply 60 (FIG. 4), and a connection jack 22 configured to receive a cable or other connection for coupling with the load 62 (FIG. 4). Jacks 20, 22 may be referred to as interfaces and configured to communicate electrical power and/or control signals in any suitable manner. Although described as an internal part of the power supply apparatus 10 (FIG. 1), the control circuitry 16 may also be conveniently located outside of housing 12 of the power supply apparatus 10 (e.g., in a high-power connector shown in FIG. 1 of the incorporated patent application) while still controlling functioning of the power supply apparatus 10 and an operation of the load 62 as described below.

Referring again to FIG. 1, the power supply 60 may include any convenient source of electrical power, such as a utility line, generator, alternator, etc. If the supply is implemented as an alternating current supply, a rectifier (not shown) may be utilized to provide direct current electrical energy to the power supply apparatus 10. The power supply apparatus 10 is configured to provide the electrical energy to the load 62 which is configured to couple with the connection jack 22 and/or to utilize the electrical energy to charge the storage device 30. In the absence of an alternating current power supply, electrical energy stored within the power supply apparatus 10 may be supplied to the load 62.

Referring to FIG. 3, further details of the power supply apparatus 10 are described. The depicted arrangement of the power supply apparatus 10 includes the storage device 30 configured to receive, store and supply electrical energy. Storage device 30 includes one or more electrochemical devices 32 in exemplary embodiments. In the illustrated arrangement, four electrochemical devices 32 are provided and are coupled in series to form a battery. A particular configuration of the power supply apparatus 10 may be dictated by an application in which it will be used to supply electrical energy. The power supply apparatus 10 additionally includes circuitry 34 configured to receive control signals from the control circuitry 16 (e.g., boost converter 40 may be disabled during coupling of power supply 60 with control circuitry 16) in order to control and monitor operations of the power supply apparatus 10. For example, circuitry 34 receives control signals from the control circuitry 16 and implements charging, maintenance, and discharging as well as conditioning of electrical energy extracted from the electrochemical devices 32. The control circuitry 16 may also control operations of the load 62. Further details regarding one possible arrangement of circuitry 34 are discussed with respect to FIG. 4.

Referring to FIG. 4, operations of one exemplary embodiment of power supply apparatus 10 are described with respect to a plurality of components of circuitry 34. The depicted electrical components of circuitry 34 are illustrated within housing 12 in the described arrangement. Circuitry 34 and its components may be implemented using a printed circuit board.

In accordance with one exemplary embodiment, circuitry 34 includes an internal interface 36, a boost converter 40, charge circuitry 42, switch device circuitry 44, and a capacity monitor 46. In an exemplary case, the control circuitry may be located outside of the power supply apparatus 10 as mentioned previously. In one such case, the control circuitry 16 may be provided in a connector configured to removably electrically couple with the interface 36. The control circuitry 16 is coupled with the power supply 60, such as, for example, an AC adapter providing rectified electrical energy, and the load 62, such as, for example, a notebook computer or other high-power load device.

Power supply 60 and the storage device 30 provide electrical energy for usage within the load 62. When the power supply 60 is coupled with the control circuitry 16, the boost converter 40 is disabled and the load 62 receives electrical energy from the power supply 60. If the load 62 is not utilizing maximum electrical energy from the power supply 60 (i.e., not consuming all available power), such reserve or extra remaining energy may be utilized to charge the storage device 30 using charge circuitry 42. When the power supply 60 is not coupled with the control circuitry 16, and in the presence of the load 62 at the control circuitry 16, the boost converter 40 is enabled to increase a voltage of electrical energy from the storage device 30 and to supply the electrical energy to the load 62.

Charge circuitry 42 is configured to control and implement enabling/disabling of charging and conditioning operations of the storage device 30. For example, charge circuitry 42 is configured to monitor a quantity of electrical energy supplied from the power supply 60 to the load 62. Responsive to such monitoring, charge circuitry 42 controls a supply of electrical energy from the power supply 60 to storage device 30 to charge one or more electrochemical devices 32 (FIG. 3). Charge circuitry 42 is arranged in the described configuration to ensure that the load 62 receives adequate electrical energy for proper operation.

Capacity monitor 46 is configured to monitor a state of charge of electrochemical devices 32 (FIG. 3). Capacity monitor 46 is coupled with switch device circuitry 44 and is configured to control such switch device circuitry 44 responsive to the monitoring. In one embodiment, switch device circuitry 44 includes a charge field effect transistor (FET) and a discharge field effect transistor which are controlled to implement charging, discharging and maintenance operations.

In one embodiment, the boost converter 40 is coupled intermediate the storage device 30 and the interface 36 to receive electrical energy from the storage device 30 and to increase a voltage of the electrical energy delivered to the load 62. According to an exemplary embodiment wherein the storage device 30 includes four series coupled lithium cell electrochemical devices 32, electrical energy having a nominal voltage of 13.2 Volts is provided and received by the boost converter 40. Exemplary high-power loads (e.g., notebook computers) utilize electrical energy at a voltage of approximately 19.4 Volts. The boost converter 40 in one exemplary configuration increases a voltage of electrical energy received from storage device 30 (e.g., 13.2 Volts) to electrical energy having an increased voltage (e.g., 19.5 Volts). As described further below, the control circuitry 16 is arranged in at least one configuration to control the output voltage of the boost converter 40 corresponding to the load 62 coupled with the control circuitry 16.

The boost converter 40 is configured to operate in one of an enabled mode of operation or a disabled mode of operation. Upon disconnection of the power supply 60 to the power supply apparatus 10, the boost converter 40 is provided in the enabled mode of operation to supply electrical energy from the storage device 30 to the load 62. When the power supply apparatus 10 is coupled with the power supply 60 to receive electrical energy therefrom, the boost converter 40 operates in a disabled mode and ceases provision of electrical energy to interface 36 and to the control circuitry 16 for application to the load 62. In one exemplary arrangement, the boost converter 40 is configured to detect the presence of the power supply 60 and to enter the disabled mode of operation. When enabled, the boost converter 40 provides electrical energy of an increased voltage to the control circuitry 16 for application to the load 62. If a capacity of the boost converter 40 is exceeded, it may increase in temperature. As described below, aspects hereof operate to maintain operation of boost converter 40 at proper temperatures.

Boost converter 40 is configured in at least one embodiment to accommodate different configurations of the load 62. For example, the voltage of electrical energy output from the boost converter 40 may be tailored to a specific load. In one embodiment, the control circuitry 16 controls the output voltage of the boost converter 40. Further details are described in the patent application incorporated by reference as noted above.

FIG. 5 illustrates details of exemplary components of the load 62. In one embodiment, load 62 includes a housing 65 configured to house internal charging circuitry 63 for controlling charging of one or more batteries 64 coupled with the housing 65. In the presence of supply energy from the power supply 60, the internal charging circuitry 63 enables charging of the one or more batteries 64. In the absence of supply voltage from the power supply 60, the load 62 derives power from the storage device 30 of the power supply apparatus 10 (FIG. 4).

FIG. 6 shows an exemplary circuit schematic of the control circuitry 16. The illustrated schematic generally corresponds to FIG. 6 of the incorporated application. As noted above, the control circuitry 16 includes a connection jack/port 24 configured to couple with the interface 36 (FIG. 4). Another connection jack 20 is configured to couple with the power supply 60. For example, an AC adapter providing rectified electrical energy may be removably connected to the connection jack 20. A further connection jack 22 is configured to removably couple with the load 62 (FIG. 4). In one embodiment, pinouts of connectors 20, 22, and 24, respectively, are shown as below:

Connector 20 Pinout

| Pin Number | Description |
|---|---|
| 1 | Ground (Power return) |
| 2 | Adapter ID pin |
| 3 | Adapter Power—This is used to charge the power supply apparatus 10 and pass power on to the load 62 (e.g., notebook computer) or upstream device (i.e. another power supply apparatus 10) |
| 4 | Ground (Connector Shield) |
| 5 | Ground (Connector Shield) |

Connector 22 Pinout

| Pin Number | Description |
|---|---|
| 1 | Adapter ID pin |
| 2 | Adapter Power—This is used to pass power on to the load 62 (e.g., notebook computer) or upstream device (e.g., another power supply apparatus 10) |
| 3 | Ground (Power return) |

Connector 24 Pinout

| Pin Number | Description |
| --- | --- |
| 1 | AC adapter Voltage sense pin |
| 2 | AC adapter Current sense pin |
| 3 | Power supply apparatus output voltage (15–24VDC) |
| 4 | Ground |
| 5 | Boost converter enable (Enables power supply apparatus 10 output voltage) |
| 6 | Voltage Identification |

The control circuitry 16 also includes at least a transistor 92 and a diode 94 for controlling charging of the batteries 64 of the load 62 using internal charging circuitry 63. For example, the control circuitry 16 produces a control signal of a low/high state at the third connection jack 22 to control (e.g., enable/disable) charging the batteries 64 of the load 62 using the internal charging circuitry 63. In an exemplary embodiment, the control signal may be produced at pin 2 of the third connection jack 22.

As described above, in the absence of power supply 62 at the control circuitry 16, the boost converter 40 enters an enabled mode of operation to provide electrical energy stored in the storage device 30 to the load 62. In the event the load 62 consumes power that is beyond the output capacity of the power supply apparatus 10 (FIG. 4), an increase in temperature of the boost converter 40 occurs (e.g., usage of internal charging circuitry 63 may exceed a capacity of apparatus 10). This increase in temperature is sensed at the connection jack 24 of the control circuitry 16. In one embodiment, the increase in temperature of the boost converter 40 causes an increase of leakage current across diode 94 and controls operation of transistor 92 (e.g., turning ON) which in turn controls a signal output at the connection jack 22 to which the load 62 is removably coupled. For example, the temperature increase resulting from the boost converter 40 is sensed by the diode 94 which may be positioned in close proximity or other temperature-sensing relation with respect to boost converter 40.

Schottky diodes (Metal on Semiconductor) have a higher reverse leakage current than a traditional diode (PN). The amount of reverse leakage through a Schottky diode is highly temperature dependant (i.e. leakage increases as with temperature).

The boost converter 40 within the power supply apparatus 10 is the source of heat as the conversion from the storage device 30 to a regulated voltage is less than 100% efficient. For example, under normal loading conditions the boost converter 40 may realize up to 90% conversion efficiency. This means that if the load 62 (e.g., notebook) requires 30 W of power, the power supply apparatus 10 will be consuming 33.33 W of power out of the storage device 30. The difference between the power drawn and the power delivered is the power lost in conversion which results as heat. In this example, the lost power would be 3.33 W that would be dissipated as heat.

As the load demand increases, efficiency of the boost converter 40 may tend to decrease due to higher currents, thus creating more additional heat in the conversion process. The dissipated heat may be seen, for example, using an Infrared camera extending to the connector 22 (FIG. 6). By placing the diode D4 in close proximity to connector 24, an increase in dissipated heat results in an increase of the leakage through the diode D4. The resistors R7 and R9 may be tuned to set the turn on threshold of transistor 92 as a function of temperature. When the transistor 92 turns on, it signals to the load 62 that the power supply apparatus 10 ceases charging the internal battery of the load 62 in one embodiment. As a result the power drawn from the power supply apparatus 10 would immediately decrease.

In one embodiment, the transistor 92 controls the output signal at pin 2 of the connection jack 22 to be switched to a high state, thereby disabling the charging circuitry 63 of the load 62 and disabling charging of the batteries 64. In one exemplary arrangement, pin 2 of jack 22 may be coupled with an appropriate interface of load 62 to control the internal charging circuitry 63. For example, if the load 62 comprises a Dell notebook computer model Inspiron 8100, pin 2 may supply a control signal to a keyboard controller configured to disable charging of batteries 64 of the load 62 using the internal charging circuitry 63.

In the absence of the power supply 60 at the control circuitry 16, and the load 62 consumes electrical energy from the power supply apparatus 10 (FIG. 4) to power the load as well as charge the batteries 64, disabling charging of the batteries 64 reduces power consumption by the load 62 from a first higher level to a lower second level more appropriate for apparatus 10. The power supply apparatus 10 may risk a shut down if the load 62 consumes power at a level not sustainable by the power supply apparatus 10. For example, the lower second level of consumption may be at a level sustainable by the power supply apparatus 10, thereby preventing an unexpected shut down of the power supply apparatus 10.

Thus, the control circuitry 16 controls charging of the batteries 64 of the load 62 using the internal charging circuitry thereof to control the rate of power consumption by the load 62. For example, when the load 62 is consuming electrical energy that is beyond the output capacity of the power supply apparatus 10, controlling an operation of the load 62 (e.g., disabling the charging of the batteries 64) results in reduced power consumption by the load 62, thus reducing a burden on the power supply apparatus 10.

Figure 7:
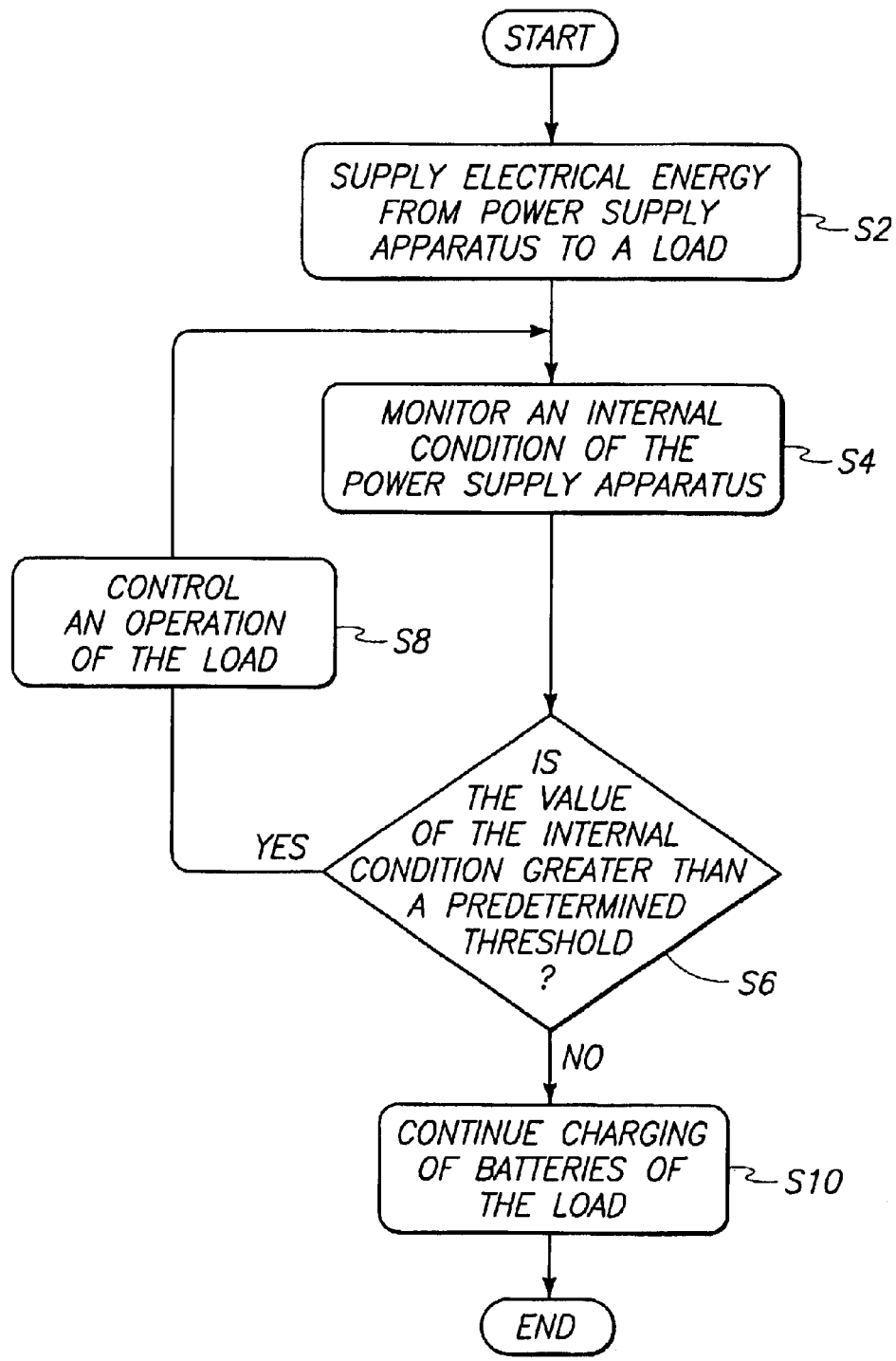
FIG. 7 is a flow chart for controlling charging of a load coupled to the power supply apparatus according to one embodiment.

FIG. 7 shows an exemplary flow diagram for controlling the charging circuitry of a load using the power supply apparatus.

Initially, at a step S2, electrical energy from the power supply apparatus 10 having storage device 30 is supplied to the load 62. Step S4 is then performed.

At a step S4, the control circuitry 16 monitors an internal condition of the power supply apparatus 10 (e.g., using transistor 92 and diode 94). Step S6 is then performed.

At a step S6, an inquiry is made to determine if a value of the monitored condition is greater than a predetermined threshold value (e.g., corresponding to leakage current of diode 94, and increased temperature of the boost converter 40). If true, step S8 is performed and the method proceeds to step S4. Otherwise, step S10 is performed.

At a step S8, the control circuitry 16 controls an operation of the load 62. For example, disabling of internal charging circuitry 63 of the load 62 may be performed.

At a step S10, charging of the batteries 64 of the load 62 is continued if the monitored condition is within the predetermined threshold value. Following step S10, the method may be repeated.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical energy system comprising:
a power supply apparatus having an electrical energy storage device for storing electrical energy;
an external load having one or more batteries, the load adapted to receive electrical energy from the electrical energy storage device; and
wherein the power supply apparatus comprises control circuitry for monitoring a condition of the power supply apparatus and controlling an operation of the load responsive to the monitored condition.

2. The electrical energy system of claim 1, wherein the control circuitry is configured to control the operation comprising controlling internal charging circuitry of the load, the internal charging circuitry configured to charge the one or more batteries of the load.

3. The electrical energy system of claim 1, wherein the load is configured to have plural rates of electrical energy consumption, and the control circuitry is configured to control the operation comprising controlling the rates of electrical energy consumption.

4. The electrical energy system of claim 3, wherein the control circuitry is configured to control the operation comprising controlling the load to operate at one of the rates of electrical energy consumption sustainable by the power supply apparatus.

5. The electrical energy system of claim 1, wherein the control circuitry is configured to monitor the condition comprising temperature.

6. The electrical energy system of claim 1, wherein the control circuitry communicates a control signal via a removable coupling to control the load.

7. The electrical energy system of claim 1, wherein the power supply apparatus comprises:
a boost converter configured to increase a voltage of electrical energy received from the storage device prior to supplying the electrical energy of increased voltage to the load, and the control circuitry is configured to monitor a temperature of the boost converter to monitor the condition.

8. The electrical energy system of claim 1, wherein the control circuitry comprises:
at least one transistor; and
at least one diode, wherein a rise in temperature of the boost converter causes a leakage of current through the at least one diode, thereby controlling the at least one transistor.

9. The electrical energy system of claim 1, wherein the load and the power supply apparatus are provided in respective separate housings and are coupled via a removable coupling.

10. A power supply apparatus comprising:
an interface adapted to couple to an external load;
an electrical energy storage device coupled with the interface and configured to supply electrical energy to the external load via the interface; and
control circuitry configured to monitor an internal condition of the power supply apparatus and to control an operation of the external load responsive to the monitored condition.

11. The power supply apparatus of claim 10, wherein the control circuitry is configured to control an operation of internal charging circuitry of the load which is configured to charge a battery of the load.

12. The power supply apparatus of claim 10, further comprising:
a boost converter configured to increase a voltage of electrical energy received from the electrical energy storage device; and
the control circuitry is configured to monitor the internal condition comprising a temperature of the boost converter.

13. The power supply apparatus of claim 12, wherein the control circuitry comprises:
at least one transistor; and
at least one diode, wherein a rise in temperature of the boost converter causes a leakage of current through the at least one diode, thereby controlling the at least one transistor.

14. An electrical energy system comprising:
a power supply apparatus; and
an external load removably coupled to the power supply apparatus;
the power supply apparatus including:
an electrical energy storage device;
a boost converter configured to increase a voltage of electrical energy received from the storage device, and to provide the electrical energy of increased voltage to the external load; and
control circuitry for controlling internal charging circuitry of the external load responsive to monitoring a temperature of the boost converter.

15. The electrical energy system of claim 14, wherein the control circuitry is configured to disable the internal charging circuitry of the external load if the temperature of the boost converter triggers a predetermined threshold.

16. The electrical energy system of claim 14, wherein the external load is configured to have plural rates of electrical energy consumption, and the control circuitry is configured to control the rates of electrical energy consumption.

17. The electrical energy system of claim 14, wherein the control circuitry includes:
at least one transistor; and
at least one diode, wherein a rise in temperature of the boost converter causes a leakage of current through the at least one diode, thereby controlling the at least one transistor.

18. The electrical energy system of claim 14, wherein the control circuitry is configured to disable the internal charging circuitry to reduce rate of consumption of electrical energy by the external load.

19. An electrical energy supply method comprising:
providing a power supply apparatus and a load disposed external to the power supply apparatus;
supplying electrical energy from the power supply apparatus to the load;
monitoring an internal condition of the power supply apparatus using circuitry of the power supply apparatus; and
controlling an operation of the load responsive to the monitored condition.

20. The method of claim 19, wherein the controlling comprises controlling charging one or more batteries of the load.

21. The method of claim 19, wherein the monitoring includes detecting leakage current across at least one diode of the circuitry, and the controlling includes controlling at least one transistor of the circuitry in response to the detecting.

22. The method of claim 19, wherein the monitoring includes monitoring a temperature of a boost converter of the power supply apparatus, the boost converter configured to increase a voltage of electrical energy of the one or more batteries from a first level to a higher second level.

23. An electrical energy supply method comprising:
providing a power supply apparatus configured to store electrical energy;
removably coupling an external load to the power supply apparatus, the load operating at a first rate of electrical energy consumption;
supplying electrical energy from the power supply apparatus to the external load;
monitoring an internal condition of the power supply apparatus; and
using the power supply apparatus, controlling the external load to operate in a reduced second rate of electrical energy consumption responsive to the monitoring.

24. The method of claim 23, wherein the controlling is initiated if the internal condition triggers a predetermined threshold value.

25. The method of claim 23, wherein the controlling comprises disabling internal charging circuitry of the external load.

26. The method of claim 23, wherein the monitoring includes monitoring a temperature of a boost converter disposed within the power supply apparatus, and the controlling includes disabling internal charging circuitry of the external load if the temperature of the boost converter is greater than a predetermined threshold.

27. The method of claim 26, wherein the monitoring the temperature includes:
detecting a leakage current across at least a diode of control circuitry of the power supply apparatus; and
controlling at least a transistor of the control circuitry responsive to the leakage current.

28. A load charge control method comprising:
providing a power supply apparatus having control circuitry, the power supply apparatus configured to supply electrical energy to the load;
providing the load external of the power supply apparatus, the load having internal charging circuitry to implement charging of the load;
coupling the power supply apparatus to the load;
monitoring an internal condition of the power supply apparatus; and
controlling charging of the load using the power supply apparatus responsive to the monitoring.

29. The method of claim 28, wherein the monitoring includes monitoring a temperature of the power supply apparatus.

30. The method of claim 28, wherein the monitoring includes monitoring a temperature of a boost converter disposed within the power supply apparatus.

31. The method of claim 28, wherein the controlling includes disabling the internal charging circuitry of the load.

32. The method of claim 31, wherein the disabling is performed if the temperature of the boost converter is greater than a predetermined threshold.

33. The method of claim 28, wherein the monitoring includes:
detecting a leakage current across at least a diode of the control circuitry; and
controlling at least a transistor of the control circuitry responsive to the detecting.

34. The electrical energy system of claim 1, wherein the power supply apparatus is configured to utilize electrical energy from an electrical supply external of the power supply apparatus to charge the electrical energy storage device of the power supply apparatus.

35. The electrical energy system of claim 1, wherein the control circuitry is configured to control the operation of the load comprising controlling charge circuitry of the load configured to charge the one or more batteries of the load.

36. The power supply apparatus of claim 10, wherein the electrical energy storage device is configured to store electrical energy received from an electrical supply external of the power supply apparatus.

37. The electrical energy system of claim 14, wherein the electrical energy storage device is configured to store electrical energy received from an electrical supply external of the power supply apparatus.

38. The method of claim 19, further comprising charging electrical energy storage circuitry of the power supply apparatus using electrical energy received from a supply external of the power supply apparatus, and wherein the supplying comprises supplying the electrical energy from the electrical energy storage circuitry of the power supply apparatus.

39. The method of claim 23, further comprising charging electrical energy storage circuitry of the power supply apparatus using electrical energy received from a supply external of the power supply apparatus, and wherein the supplying comprises supplying the electrical energy from the electrical energy storage circuitry of the power supply apparatus.

40. The method of claim 28, further comprising, using the power supply apparatus, storing electrical energy received from an electrical supply external of the power supply apparatus, and supplying the electrical energy stored using the power supply apparatus to the load.

* * * * *